(12) United States Patent
Chavez et al.

(10) Patent No.: US 10,916,905 B2
(45) Date of Patent: Feb. 9, 2021

(54) EXTERNAL ELECTRICAL POWER DISTRIBUTION APPARATUS

(71) Applicants: Jose Antonio Chavez, San Jose, CA (US); James Arthur Borthwick, Santa Clara, CA (US)

(72) Inventors: Jose Antonio Chavez, San Jose, CA (US); James Arthur Borthwick, Santa Clara, CA (US)

( * ) Notice: Subject to any disclaimer, the term of this patent is extended or adjusted under 35 U.S.C. 154(b) by 0 days.

(21) Appl. No.: 16/153,821

(22) Filed: Oct. 7, 2018

(65) Prior Publication Data

US 2019/0109427 A1    Apr. 11, 2019

Related U.S. Application Data

(60) Provisional application No. 62/569,612, filed on Oct. 8, 2017.

(51) Int. Cl.

| | |
|---|---|
| *H01R 33/88* | (2006.01) |
| *H01R 33/06* | (2006.01) |
| *F21V 23/04* | (2006.01) |
| *H02G 3/10* | (2006.01) |
| *F21V 21/00* | (2006.01) |
| *H02G 3/18* | (2006.01) |
| *H02G 3/08* | (2006.01) |
| *H01R 13/52* | (2006.01) |
| *F21W 131/107* | (2006.01) |
| *H01R 33/955* | (2006.01) |

(52) U.S. Cl.
CPC ............. *H01R 33/88* (2013.01); *F21V 21/00* (2013.01); *F21V 23/0464* (2013.01); *F21V 23/0471* (2013.01); *H01R 33/06* (2013.01); *H02G 3/10* (2013.01); *H02G 3/18* (2013.01); *F21W 2131/107* (2013.01); *H01R 13/5213* (2013.01); *H01R 33/955* (2013.01); *H02G 3/081* (2013.01)

(58) Field of Classification Search
CPC ..... H01R 33/88; H01R 33/06; F21V 23/0464; F21V 23/0471; F21V 21/00; H02G 3/10; H02G 3/18; H02G 3/081
See application file for complete search history.

(56) References Cited

U.S. PATENT DOCUMENTS

| | | | | |
|---|---|---|---|---|
| 4,266,266 A | * | 5/1981 | Sanner | H02B 1/50 174/38 |
| 7,374,317 B2 | * | 5/2008 | Prazoff | F21V 23/00 174/67 |
| 7,467,888 B2 | * | 12/2008 | Fiene | H01R 31/065 362/221 |

* cited by examiner

*Primary Examiner* — Thomas M Sember

(57) ABSTRACT

An external electrical power distribution apparatus and method for adding electrical power distribution to the exterior of a building are disclosed. The external electrical power distribution apparatus includes a base configured to be mounted to a support structure on one side and further configured such that an electrical device can be mounted on a different side than the side mounted to the support structure. The base includes electrical power distribution outlets housed within it, and the housing also includes electrical wiring for providing electrical power to the electrical device and electrical power distribution outlets.

9 Claims, 5 Drawing Sheets

EXTERNAL ELECTRICAL POWER DISTRIBUTION APPARATUS

RELATED APPLICATIONS

This application claims the benefit of U.S. Provisional Patent Application No. 62/569,612, filed Oct. 8, 2017, entitled "EXTERNAL ELECTRICAL POWER DISTRIBUTION APPARATUS." The foregoing provisional application is hereby incorporated herein by reference in its entirety for all purposes.

FIELD OF INVENTION

The present invention relates generally to the field of outdoor electrical power distribution and in particular to adding outdoor electrical power distribution capability through existing outdoor electrical power connections, such as external light fixtures, which do not have electrical power distribution capabilities.

BACKGROUND

Many buildings have outdoor electrical power connections for specific purposes such as external light fixtures. However, often additional uses of electrical power are needed but there may not be a corresponding connection or outlet readily available. For example, homeowners will often add external decorations requiring electrical power during holiday periods. In many cases, there are not close enough or sufficient electrical outlets to support convenient use of these items and the homeowner is required to use long extension cords or pay for expensive, additional wiring and outlets to be added to their home.

U.S. Pat. No. 7,374,317 discloses external power outlets that are integrated into an external light fixture. However, this solution does not address the need when a different external light fixture is more desirable. For example, if a homeowner already has a set of light fixtures without outlets that they prefer to use due to the look or style, or they prefer not to replace an entire light fixture assembly to get the functionality they need, the prior art is not viable. Additionally, the existing solution does not address the need to provide more flexibility in the types of electrical power and connectors or outlets since these integrated light fixtures and outlets only provide AC power through standard outlets.

Another option for adding AC connections to external light fixtures includes adapters that screw into the light fixture light socket and provide an outlet through a series connection in between the light fixture and light bulb. These address the need for adding electrical power distribution capability without replacing the light fixture, but are often not a viable option because the light fixture is enclosed or otherwise not physically convenient to plug a large exterior style electrical plug into. Furthermore, these adapters do not typically provide a safety ground connection and would not on their own provide Ground Fault Circuit Interruption (GFCI) protection.

SUMMARY

In accordance with an embodiment, an external, electrical power distribution apparatus is disclosed. The distribution apparatus includes a base that is configured to be mounted to a support structure such as a wall. Additionally, the base is configured to have one or more items mounted to it on one or more sides. In some embodiments, the item(s) include external light fixtures that are electrically powered through the base of the distribution apparatus instead of directly from wiring in the wall or other support structure. Furthermore, the base is configured to include one or more outlets and/or connectors for distributing electrical power signals. In one embodiment, the outlets and/or connectors are standard AC power connections for plugging tools, lights, decorations, or other devices power by AC electricity.

DETAILED DESCRIPTION

The present invention relates generally to the field of outdoor electrical power distribution and in particular to adding outdoor electrical power distribution capability through existing outdoor electrical power connections.

It will be understood that the specific shapes and configurations are not confined to the embodiments illustrated in the figures. As is commonly known, there are a variety of styles and configurations for external light fixtures, and the embodiments shown would only be one possible shape and configuration for differing external light fixture styles and configurations.

Figure 1:
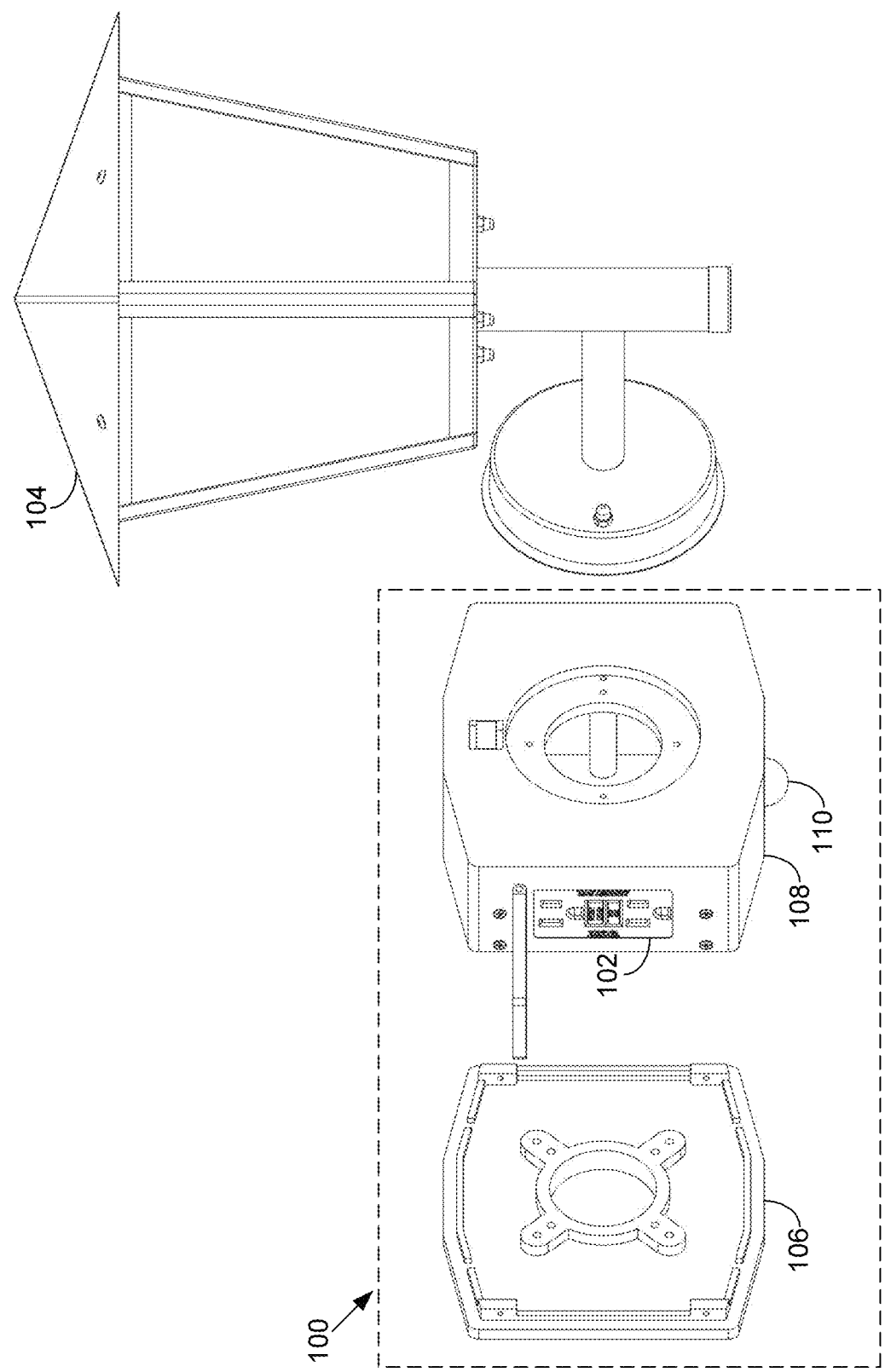
FIG. 1 is a partially exploded perspective view of an embodiment and illustrates a base, including a base housing and rear mounting plate, configured to provide AC electrical power distribution through electrical outlets, and to be mounted between a standard external light fixture (shown) and support structure (not shown).

FIG. 1 depicts an embodiment in which a base 100 is configured to provide AC electrical power distribution through electrical outlets 102 and to be mounted between a standard external light fixture 104 and support structure (not shown). In an example use of this embodiment, a homeowner removes the standard external light fixture 104 from its mounting on a wall or support structure, and disconnects the electrical power from the external light fixture 104. The base 100 is then mounted in the location where external light fixture 104 was previously located, and the electrical power that was connected to the external light fixture 104 is connected to the base 100 instead. This electrical power is then available at the electrical outlets 102 so the homeowner can power other items with convenience.

Base 100 is typically mounted to an electrical box or other fitting at an elevated location on an exterior wall or support structure. The manner of mounting is well established in the art, and base 100 uses the standard connections and fittings. Accordingly, it will be understood that base 100 is ordinarily connected to a source of single phase alternating current, typically 120 volts, or such other standard electrical power provided to residences in the United States and other countries. Wires (not shown) located within base 100 connect to the wires available within the wall or support structure to which base 100 is being connected.

In the embodiment described above, the external light fixture 104 that was disconnected and removed may then be mounted on the base 100. The electrical power for external light fixture 104 then comes through the base 100. In this manner, the homeowner can add the functionality of external power distribution while maintaining the external lighting functionality, without having to replace existing light fixtures or add separate wiring and circuits for external outlets.

The embodiment depicted in FIG. 1 further shows that the base 100 made up of base housing 108 and rear plate 106 is mounted using the rear plate 106, which is configured to be mounted to the wall or support structure with the electrical wiring routed through the rear plate 106 to the base housing 108 for the electrical outlets 102 and external light fixture 104. Once electrical power is connected to the base housing 108 through screw terminals, push terminals, or the like, any slack electrical wiring will be pushed back through the hole into the wall or support structure, and/or stored in the base 100. The base housing 108 is then mounted to the rear plate 106 so that the base housing 108 and rear plate 106 create a substantially sealed enclosure. By using a separate rear plate 106 and base housing 108, installation of the wiring into the base 100 can be easier since the base housing 108 is more open for connecting the electrical wires to the connections in the base 100. In some embodiments, the rear plate 106 is integrated into the base 100 or is not included for cost-savings purposes.

Additionally, in FIG. 1 a sensor unit 110 is depicted at the bottom of the base 100. The sensor unit 110 may include a motion sensor, a light sensor, or a combination of both. A common desirable feature for external lights is that the lights will turn on and off automatically under certain conditions. For example, it is typically desirable that lights do not turn on during the day when it is already light out. A light sensor can detect this and when included with other circuitry can ensure that the lights remain off when they are not useful. In some embodiments, a light sensor is included in the sensor unit 110 for adding this functionality to the external light fixture.

Another useful feature is using motion detection to turn on lights. Since external lights are often near an entryway to a home or other building, a beneficial feature is to detect motion near the light and turn on the lights when motion is detected. This can be helpful, for example, when someone comes to an entryway in the dark and needs to find their keys to be able to unlock the door. Additionally, for security purposes using motion detection to turn on lights can provide some indication that an intruder is near a home, or will often scare away an intruder. In some embodiments, a motion sensor is included in the sensor unit 110 for adding this functionality to the external light fixture. In some embodiments, light and motion detecting sensors are included along with control circuitry in the sensor unit 110 to provide the additional functionality of both sensor types combined. In this manner, an external light fixture can have extra light and motion detection switching functionality added to it through the use of the base 100 and sensor unit 110.

Figure 2:
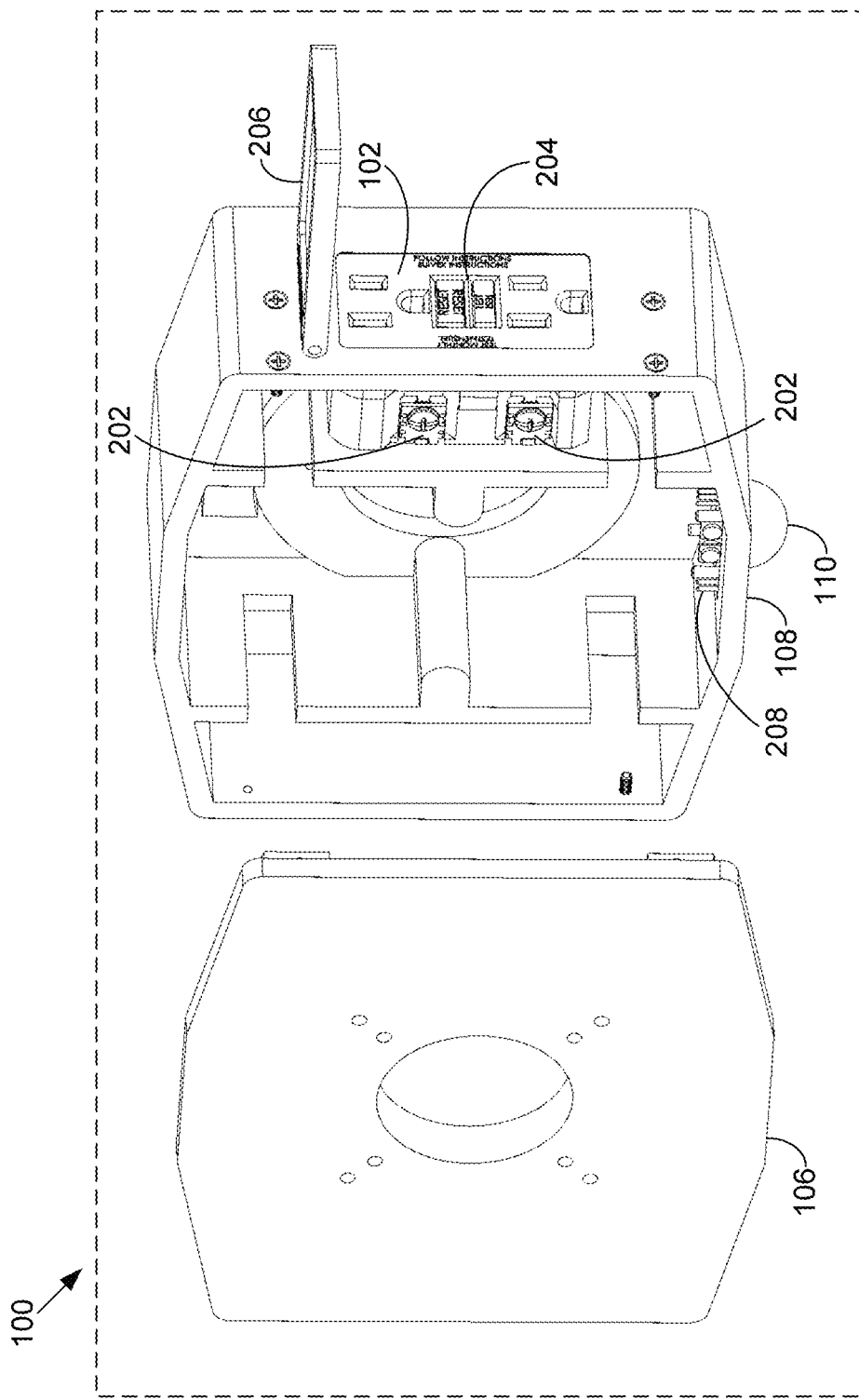
FIG. 2 is a partially exploded rear perspective view of an embodiment and shows a base with a rear plate separated from a base housing, electrical outlets mounted in the base housing, a cover for the electrical outlets in a partially open position, and internal circuitry mounted in the base housing.

FIG. 2 shows a partially exploded rear perspective view of the embodiment depicted in FIG. 1. In this view, terminals 202 for connecting the electrical outlets 102 to the electrical wiring are depicted as screw-down terminals. However, the connections may be different type of connections such as push-in connectors or others that are well known in the art. Additionally, FIG. 2 depicts the electrical outlets 102 having set and reset buttons 204 for operation of a Ground Fault Circuit Interrupter (GFCI). The electrical outlets 102 integrate the GFCI functionality for safety and to meet electrical safety codes.

In FIG. 2 the electrical outlets 102 are shown as two three-prong receptacles arranged vertically. This is a typical configuration but other embodiments may include more or less receptacles, oriented in different arrangements depending on the needs and/or size of the unit. Additionally, in some embodiments, the electrical outlets 102 include integrated current limiting hardware such as a fuse or circuit breaker to prevent too much electrical current being drawn in the event of an electrical fault or other overcurrent situation.

Further depicted in FIG. 2 is a hinged cover 206 for the electrical outlets 102. The hinged cover 206 is shown in a partially open position, but is normally in a closed position covering the electrical outlets 102 if nothing is plugged into the outlets. In some embodiments, the hinged cover 206 includes a mechanism such as a spring to force the cover shut if there is nothing plugged into the electrical outlets 102. In other embodiments, the hinged cover 206 relies on gravity to force the cover shut.

The hinged cover 206 is included to provide protection from possibly damaging external substances, such as moisture or dirt, getting into the electrical outlets 102, and to comply with electrical safety codes. In some embodiments, the hinged cover 206 includes gasket material around its edges that mate with corresponding features on the base 100 to provide a more effective seal for the area covered.

FIG. 2 also depicts a circuit board 208 located in the bottom of the base housing 108 and connected to the sensor unit 110. In some embodiments, the circuit board 208 works in conjunction with the sensor unit 110 to provide the automated light switching described in previous paragraphs. For example, the circuit board 208 may provide electrical stimulus to portions of the sensor unit 110 that output and sense various signals used in detecting a property such as motion. Additionally, the circuit board 208 may convert signals from and into different forms (e.g., analog to digital) and provide logic circuitry for determining and setting the correct state of the electrical power to the external light fixture 104 (i.e., on or off state).

In some embodiments, the circuit board 208 additionally provides circuitry for other functionality not related to the sensor unit 110. For example, the circuit board 208 may provide functionality to enable communication with other devices. Other devices may be a remote switch or a smart home controller, and the communication may be through wired or wireless means. In some embodiments, these additional functionalities are provided on a separate circuit board located in a different location within the base 100.

Figure 3:
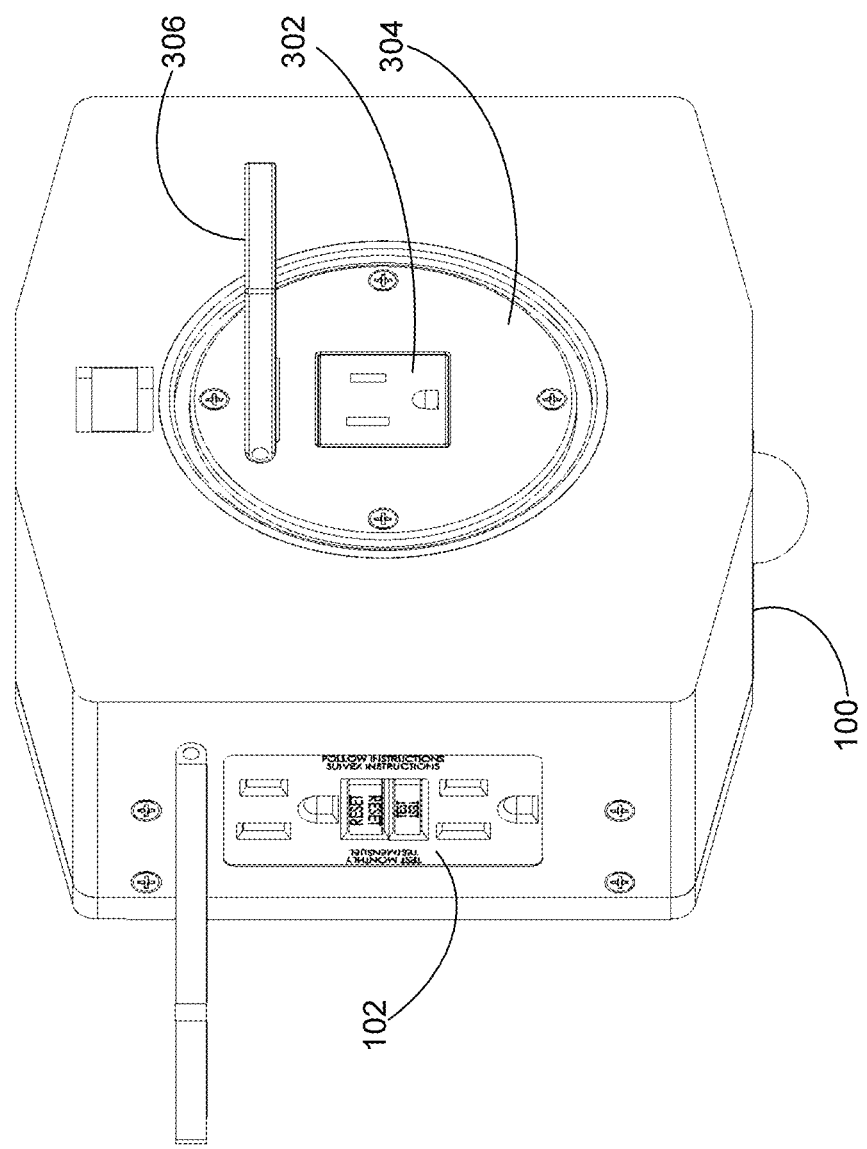
FIG. 3 is a perspective view of an embodiment and shows a fully assembled base with electrical outlets on one side of the base, an electrical outlet on a front mounting plate, and covers for the outlets in partially open positions.

FIG. 3 depicts an embodiment in which a front plate 304 is included with an additional outlet 302 and hinged cover 306. In this configuration, the additional outlet 302 provides further electrical power connections beyond the electrical outlets 102 being powered through the base 100. For example, in a typical usage the additional outlets 302 are used to power Christmas lights or other decorative lighting or items, while the electrical outlets 102 provide power for electrical tools. A standard external light fixture will not be used directly with the base 100 if front plate 304 is in place, however, external light fixtures made to be plugged into the outlet can be used, or a mating adapter for standard external light fixtures can be provided.

The electrical outlets 102 and additional outlets 302 may also provide electrical power in different forms than the standard AC electricity indicated by the receptacle in FIG. 3. For example, one configuration includes alternate connector(s) for standard DC electrical power such as USB or Power over Ethernet (PoE). The standard DC electrical power connectors may be powered by additional power conversion circuitry within the base 100 that convert a standard AC electricity to a standard DC electricity (e.g., 120 VAC to 5 V DC for a USB connection).

In some embodiments, the electrical outlets 102 and additional outlets 302 are of a single type of connector and form of electricity (e.g., AC outlets and electricity), while in some embodiments, the electrical outlets 102 and additional outlets 302 are a mixture of different connections and forms of electricity (e.g., AC and DC connections and electricity).

Figure 4:
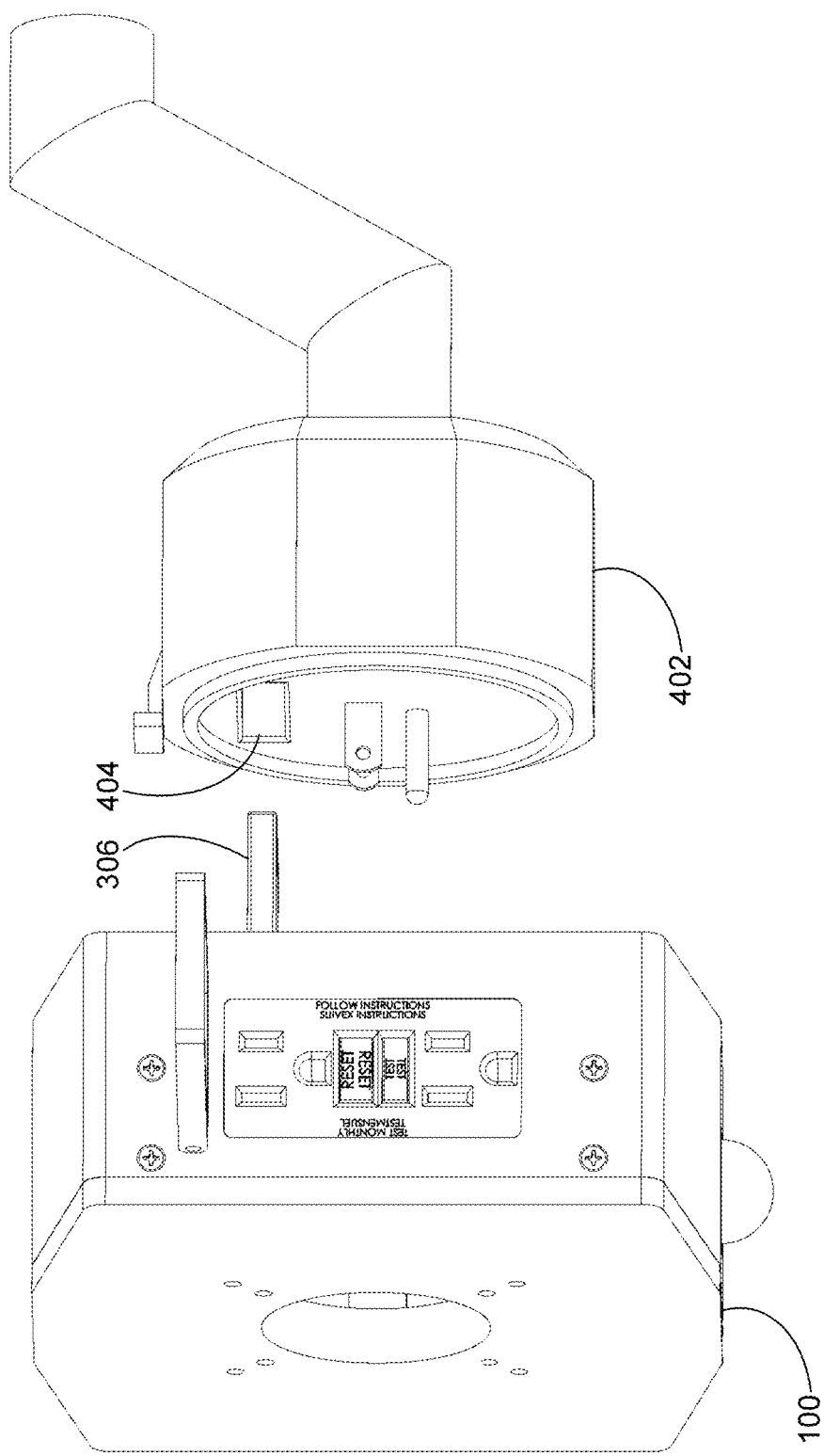
FIG. 4 is a perspective view of the embodiment shown in FIG. 3 and shows a fully assembled base with an electrical outlet on one side of the base, covers for both outlets in partially open positions, and an item configured to plug into an electrical outlet located on a front mounting plate.

FIG. 4 depicts the embodiment of FIG. 3 with a mating item 402 aligned for plugging into the additional outlets 302 (not shown in FIG. 4). The mating item 402 can be any item configured to operate using the electrical power provided through the additional outlets 302. In the illustration of FIG. 4, the mating item 402 is an item configured to use standard AC electrical power and connections. However, the mating item may in other cases be configured to use a standard (or non-standard) AC or DC electrical power connection (e.g., USB or PoE), and may provide one or more functionalities (e.g., a security camera, a light, or both).

Additionally, FIG. 4 depicts mating item 402 with an opening 404 sized to house the hinged cover 306. A typical process of plugging the mating item 402 into the additional outlet 302 requires aligning the hinged cover 306 with the opening 404, and then plugging mating item 402 into additional outlet 302. At the point that the mating item 402 is plugged into the additional outlet 302, the hinged cover 306 is housed by opening 404. The alignment of the hinged cover 306, prior to mating item 402 being plugged into the additional outlet 302, may be done manually or a separate mechanism for automatically aligning the hinged cover 306 with the opening 404 may be included.

Figure 5:
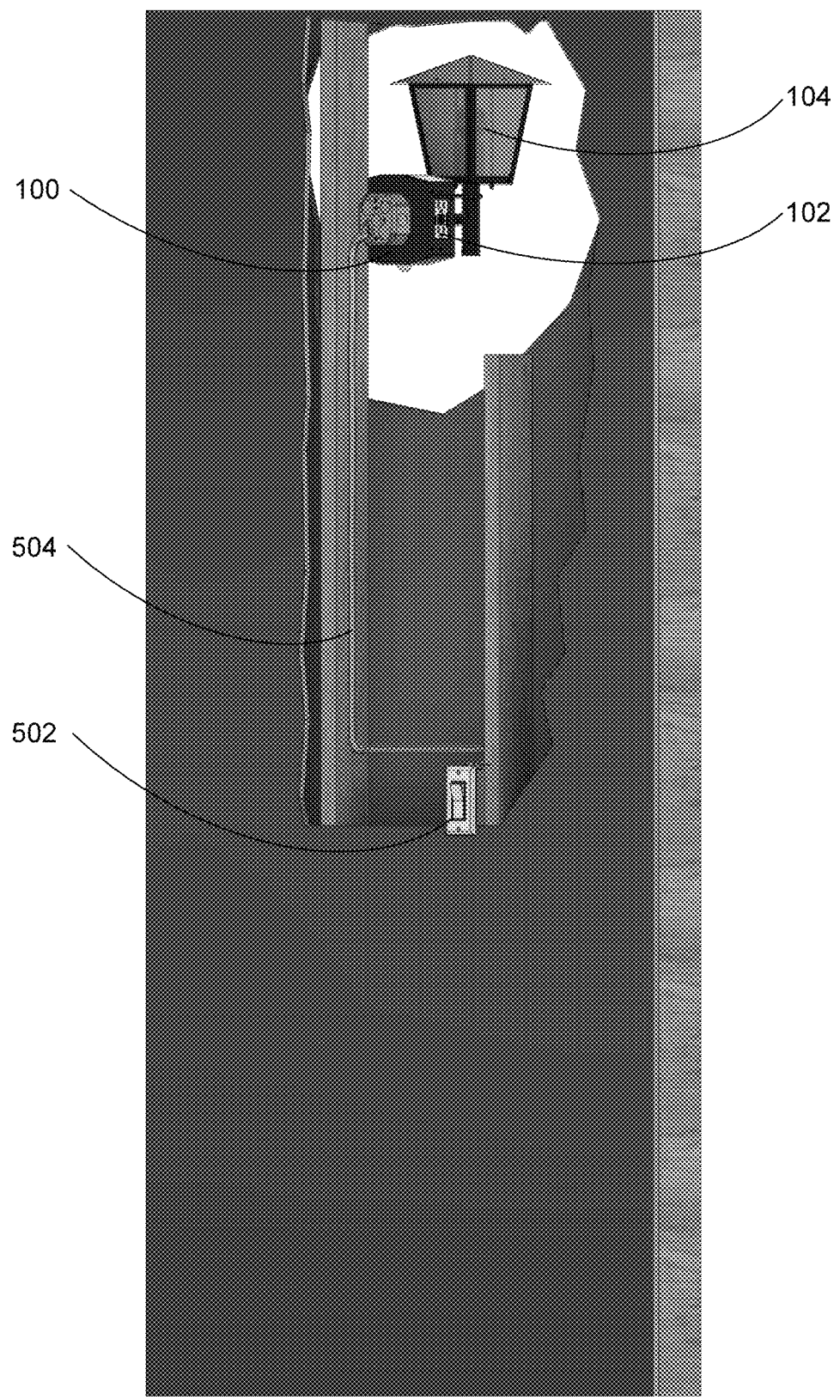
FIG. 5 is a perspective view of an embodiment showing a base with electrical outlets mounted to a wall, a light fixture mounted to the base, and pre-existing wiring connecting the light fixture through the base to a pre-existing light switch.

FIG. 5 depicts a typical installation of an embodiment, showing a base 100 with electrical outlets 102 mounted to a wall, the external light fixture 104 mounted to the base 100, and pre-existing wiring 504 connecting the light fixture through the base 100 to a pre-existing light switch 502. A typical installation procedure of an embodiment starts with the external light fixture 104 connected to AC electricity through a light switch 502 located indoors. A homeowner, for example, may want to add certain functionalities described in previous paragraphs, and will then temporarily remove the external light fixture 104 from the circuit so that the base 100 can be installed. Base 100 is then installed in the location that the external light fixture 104 was previously located and using the pre-existing wiring 504 that the external light fixture 104 was previously connected to. After the base 100 is installed, the external light fixture 104 is connected to wiring from base 100, and then mounted to base 100, either directly or through a mating adapter. The homeowner will then have added the extra functionality, with a simple addition of an embodiment of the invention.

Further functionality and options may be provided with additional minor additions to the installation described in the previous paragraph. For example, if the external light fixture switching is to be controlled separately from electrical power to the outlets, multiple options are available.

In one configuration, the pre-existing wiring 504 remains the same and the light switch 502 switches electrical power to the box 100. To enable separate control of the external light fixture 104 and electrical power to the outlets 102, a separate signal is provided to the box 100, which combined with the state of the light switch, determines whether the external light fixture 104 is powered or not. The separate signal may be a wired or wireless signal sent from a signal source such as a remote switch, a smart home controller, or a combination of these. If the signal is wired, the signal source may utilize the pre-existing wiring 504 carrying the standard AC electricity to add another signal, which will pass in conjunction with the standard AC electricity to communicate what state the external light will be. Alternatively, the signal source may be connected to separate wires routed to the box 100.

A wireless option provides more flexibility in the location and type of the signal source. For example, the wireless signal may be based on a standard wireless home automation communication protocol such as X10, Z-Wave, or others that are well known in the art. In typical operation, the signal source(s) (a smart home controller or other home automation device) will receive an activation or de-activation signal (e.g., from a corresponding application operating on a mobile device). The signal source(s) will then send out wireless signals using a specific protocol, and the box 100 receives the signals with a corresponding receiver designed for the specific protocol. The signal is then interpreted to determine whether the external light fixture 104 is to be switched on or off.

For configurations using the pre-existing light switch 502 and wiring 504, power to both the electrical outlets 102 and external light fixture 104 will be switched off if the light switch 502 is off. If the light switch 502 is on, power will be provided to the box 100, but the state of the external light fixture 104 will be determined by the wired or wireless controller as previously described.

Another configuration modifies the pre-existing wiring 504 and light switch 502 so that the external light fixture 104 can be controlled at the location of the light switch 502, so the functionality appears to be the same as it was prior to the addition of the box 100. In this configuration, the pre-existing wiring 504 at the light switch 502 is modified so that power is always applied to the box 100 (i.e., the light switch 502 is removed from the electrical power circuit). The light switch 502 is then replaced with another item, which may or may not resemble the original switch, but this replacement item does not directly switch the electrical power to the box 100. Instead, this item provides a control signal, in the same manner as described above, that is received by a corresponding receiver in the box 100 to determine whether the external light fixture 104 is to be switched on or off. As previously described, the control signal can be sent by wired or wireless means, with the wireless option providing the additional functionality of being able to be controlled by multiple signal sources including the light switch replacement and/or smart home controllers.

While only a few embodiments of the invention have been described in detail, it should be understood that many variations are possible based on the disclosure herein. Although features and elements are described above in particular combinations, each feature or element can be used alone without the other features and elements or in various combinations with or without other features and elements. In view of all of the foregoing, it should be apparent that the present embodiments are illustrative and not restrictive and the invention is not limited to the details given herein, but may be modified within the scope and equivalents of the appended claims.

What is claimed is:

1. An external electrical power distribution apparatus comprising:
   a base configured to be mounted to a support structure on one side and further configured such that an electrical device can be mounted on a different side than the side mounted to the support structure;
   electrical power distribution outlets housed within the base;
   electrical circuitry housed within the base, wherein the electrical circuitry comprises circuitry for controlling the power state of the electrical device and electrical power distribution outlets; and
   electrical wiring for providing electrical power to the electrical device and electrical power distribution outlets.

2. The external electrical power distribution apparatus of claim 1 wherein the electrical device is an external light fixture.

3. The external electrical power distribution apparatus of claim 1 wherein the electrical power distribution outlets are GFCI protected external AC outlets.

4. The external electrical power distribution apparatus of claim 1 wherein the electrical circuitry housed within the base further comprises an ambient light sensor.

5. The external electrical power distribution apparatus of claim 1 wherein the electrical circuitry housed within the base further comprises a motion sensor.

6. The external electrical power distribution apparatus of claim 1 wherein the electrical circuitry housed within the base further comprises wireless communication for controlling the power state of the electrical device and electrical power distribution outlets.

7. The external electrical power distribution apparatus of claim 1 wherein the electrical circuitry housed within the base further comprises wired communication for controlling the power state of the electrical device and electrical power distribution outlets.

8. A method for adding electrical power distribution to an exterior wall of a building comprising:
   disconnecting and removing an existing electrical device from the exterior wall;
   mounting and connecting an external electrical power distribution apparatus, comprising electrical power distribution outlets, to the exterior wall in the location the electrical device was removed from; and
   mounting and connecting the existing electrical device to the electrical power distribution apparatus.

9. The method for adding external electrical power distribution of claim 8 wherein the existing electrical device is an external light fixture.

* * * * *